United States Patent
McGehee

(10) Patent No.: US 7,622,061 B2
(45) Date of Patent: Nov. 24, 2009

(54) APPARATUS FOR CRYSTALLIZING POLYMER PARTICLES

(75) Inventor: James F. McGehee, Mount Prospect, IL (US)

(73) Assignee: UOP LLC, Des Plaines, IL (US)

(*) Notice: Subject to any disclaimer, the term of this patent is extended or adjusted under 35 U.S.C. 154(b) by 0 days.

(21) Appl. No.: 12/390,908

(22) Filed: Feb. 23, 2009

(65) Prior Publication Data

US 2009/0155139 A1 Jun. 18, 2009

Related U.S. Application Data

(62) Division of application No. 11/747,095, filed on May 10, 2007, now Pat. No. 7,514,527, which is a division of application No. 11/012,368, filed on Dec. 15, 2004, now Pat. No. 7,250,486.

(51) Int. Cl.
*G21C 21/00* (2006.01)
*C08G 63/02* (2006.01)
*C08F 6/26* (2006.01)

(52) U.S. Cl. .............. 264/5; 264/13; 264/345; 528/308; 528/491; 528/501; 528/502 C; 528/503; 425/149; 425/384

(58) Field of Classification Search ........... 264/5, 264/13, 345; 528/308, 491, 501, 502 C, 528/503; 425/149, 384
See application file for complete search history.

(56) References Cited

U.S. PATENT DOCUMENTS

| | | | | | |
|---|---|---|---|---|---|
| 3,436,449 | A | * | 4/1969 | Treu et al. ............. | 264/142 |
| 4,064,112 | A | * | 12/1977 | Rothe et al. ............ | 528/272 |
| 4,436,782 | A | * | 3/1984 | Ho ........................ | 428/402 |
| 5,290,913 | A | * | 3/1994 | McAllister et al. ..... | 528/483 |
| 5,532,333 | A | * | 7/1996 | Stouffer et al. ........ | 528/308.2 |
| 5,532,335 | A | * | 7/1996 | Kimball et al. ........ | 528/495 |
| 5,540,868 | A | * | 7/1996 | Stouffer et al. ........ | 264/13 |
| 5,628,947 | A | * | 5/1997 | Keilert .................. | 264/143 |
| 5,633,018 | A | * | 5/1997 | Stouffer et al. ........ | 425/8 |
| 5,714,262 | A | * | 2/1998 | Stouffer et al. ........ | 428/402 |
| 5,730,913 | A | * | 3/1998 | Stouffer et al. ........ | 264/8 |
| 5,744,074 | A | * | 4/1998 | Stouffer et al. ........ | 264/8 |

(Continued)

FOREIGN PATENT DOCUMENTS

DE 198 48 245 A1 * 5/2000

(Continued)

OTHER PUBLICATIONS

Polymer crystallization: The development of crystalline order in Thermoplastic polymers, J.M. Schultz, Oxford University Press, 2001, pp. 127-139.*

*Primary Examiner*—Duc Truong
(74) *Attorney, Agent, or Firm*—David J. Piasecki

(57) ABSTRACT

The present invention is a process and apparatus for conserving loss of heat while forming and crystallizing polymer particles in a liquid. The cooling liquid quenches the polymer during particle molding to facilitate shaping. The cooling liquid cools the polymer particles not below a temperature that allows adequate crystallization to occur. Cooling liquid is quickly switched with a warming liquid, so the temperature of the polymer is in the crystallization range and the heat of crystallization self-heats the polymer to a higher temperature.

4 Claims, 1 Drawing Sheet

U.S. PATENT DOCUMENTS

| | | | | |
|---|---|---|---|---|
| 5,744,578 A | * | 4/1998 | Duh | 528/492 |
| 6,297,315 B1 | * | 10/2001 | Duh et al. | 524/605 |
| 6,451,966 B1 | * | 9/2002 | Leffew et al. | 528/481 |
| 6,461,575 B1 | * | 10/2002 | Duh et al. | 422/245.1 |
| 6,740,733 B2 | * | 5/2004 | Lee et al. | 528/499 |
| 6,749,821 B1 | * | 6/2004 | McGehee et al. | 423/245.3 |
| 2005/0056961 A1 | * | 3/2005 | Bonner | 264/143 |

FOREIGN PATENT DOCUMENTS

| | | | |
|---|---|---|---|
| GB | 1143182 | * | 2/1969 |
| WO | WO 00/23497 | * | 4/2000 |
| WO | WO 2004/033174 A1 | * | 4/2004 |

* cited by examiner

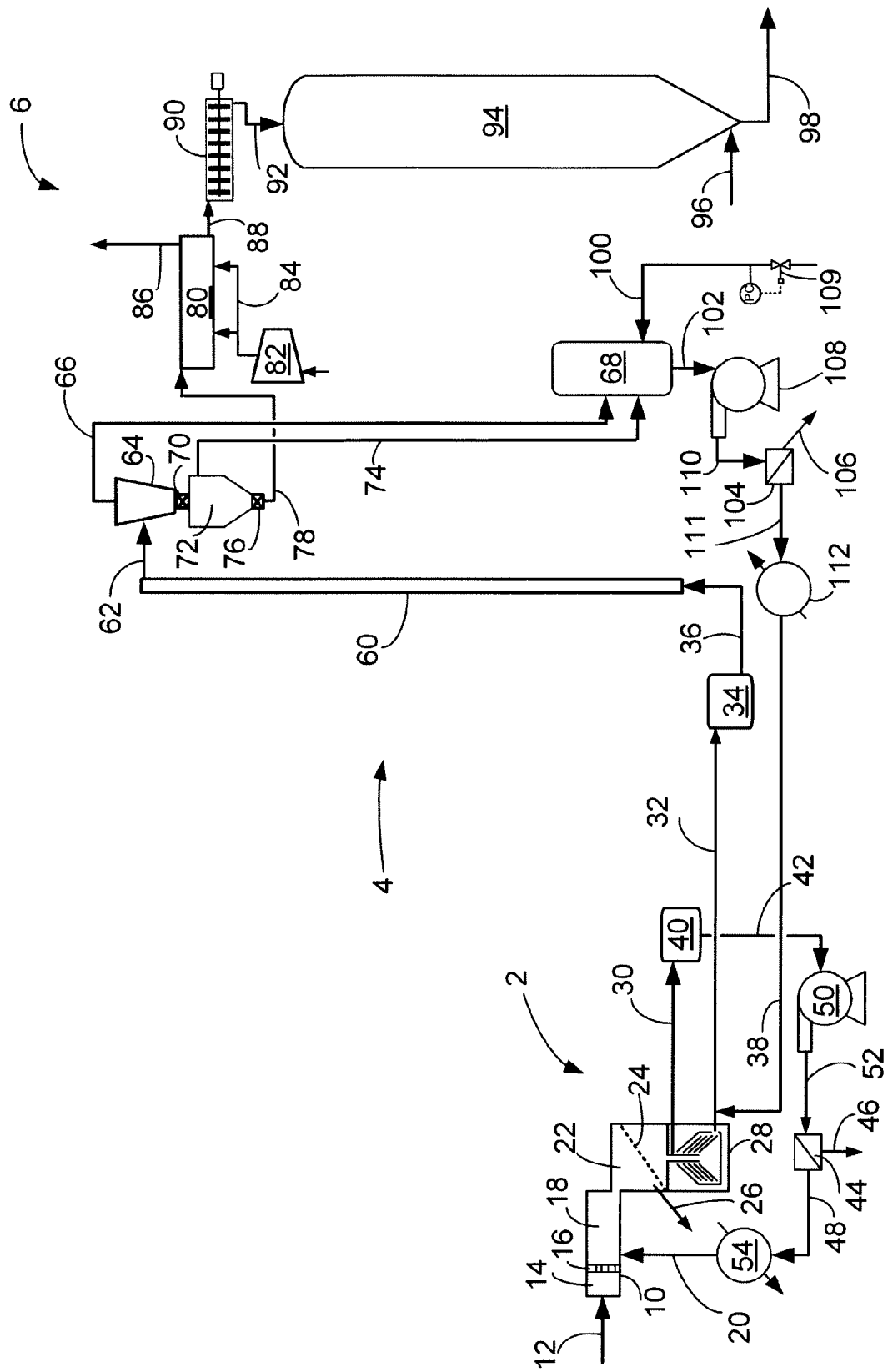

APPARATUS FOR CRYSTALLIZING POLYMER PARTICLES

CROSS-REFERENCE TO RELATED APPLICATIONS

This application is a Division of application Ser. No. 11/747,095 filed May 10, 2007, now U.S. Pat. No. 7,514,527 which application is a Division of application Ser. No. 11/012,368 filed Dec. 15, 2004, now U.S. Pat. No. 7,250,486, the contents of which are hereby incorporated by reference in its entirety.

BACKGROUND OF THE INVENTION

The present invention relates to forming and crystallizing low molecular weight polymer particles. More particularly, this invention relates to a method and apparatus for extruding, cutting and crystallizing polymer particles in a liquid medium.

Polymer resins are molded into a variety of useful products. Useful polymer resins include aromatic polyesters of which polyethylene terephthalate (PET), polytrimethylene terephthalate (PTT), polybutylene terephthalate (PBT), polytrimethylene naphthalate (PTN), polycyclohexyl terephthalate (PCT) and polyethylene naphthalate (PEN) are examples. Polyester resins, particularly PET, copolymers of terephthalic acid with lower proportions of isophthalic acid and PBT are used in the production of beverage containers, films, fibers, packages and tire cord.

Polyester resin is produced in a melt phase polymerization (MPP) process with relatively low molecular weight inadequate for commercial uses. The molecular weight of MPP product must be upgraded. Consequently, the MPP product is formed into particles and subjected to solid state polycondensation (SSP) to increase its molecular weight by maintaining the solid polymer particles at temperatures between the glass transition and the melting point temperatures while removing the reaction products under an inert gas sweep or vacuum.

Molten polyester resin from the MPP is typically extruded under pressure and cut into small particles. U.S. Pat. No. 4,436,782 discloses a machine for forming molten pellets of PET and quenching the pellets in water. GB 1,143,182 teaches a die-face polymer cutter with the die face submerged in water to immediately quench pellets upon forming. WO 00/23497 A1 discloses extruding the molten polymer into strands, quenching the strands in cooling liquid and cutting the strands into polymer particles.

According to U.S. Pat. No. 4,064,112, the tendency of the particles to agglomerate due to stickiness during solid state polycondensation (SSP) can be reduced and even eliminated if the solid state polymerization is preceded by a crystallization step which comprises thermal treatment. A process described in U.S. Pat. No. 5,540,868 forms low molecular weight polyester particles with a degree of crystallinity greater than about 15% suitable for use as an SSP feedstock. U.S. Pat. No. 5,290,913 discloses crystallizing PET particles in an agitated liquid bath and heating to crystallization temperature. U.S. Pat. No. 5,532,335 and WO 00/23497 A1 teach crystallizing polyesters in liquid over 100° C. Processes disclosed in U.S. Pat. No. 6,740,733 B2, U.S. Pat. No. 6,297,315 B1 and U.S. Pat. No. 6,461,575 B1 separate relatively cool water used in pelletizing from PTT pellets and crystallize the pellets in relatively warm water at no more than 100° C. WO 00/23497 A1 discloses cooling PET during or after forming and then crystallizing PET pellets at above 100° C.

The process in WO 2004/033174 A1 entails granulating polymer in a liquid bath or immediately conducting granulate into a liquid bath with a temperature above 100° C. Following crystallization, the granulate-liquid mixture is cooled down to around 60° C., admixed with a cooler liquid, and depressurized after which the granulate is separated from liquid.

U.S. Pat. No. 6,749,821 shows that in a typical SSP process, polymer particles are delivered to an SSP reactor system through a hopper to a heated, fluidized bed pre-crystallizer operating to achieve a degree of crystallinity. The polymer particles are then fed into a first crystallizer and then optionally into a second crystallizer. The crystallizers heat the polymer particles under mechanical agitation to bring them to the desired reaction temperature and degree of crystallinity suitable for the ensuing SSP reactor. Polyester polymers undergo exothermic heat of crystallization if not crystallized to a sufficient degree. The continuance of the crystallization process in the SSP reactor leads to problems of heat release and agglomeration or sintering of the particles, causing maldistribution of gases and solids flow interruptions. The inlet of the tall SSP reactor is high above the ground, so the particles will have to be lifted to the inlet to enter the SSP process. In industrial practice, this is usually by slow motion pneumatic conveying.

The melting point, $T_m$, of a polymer is preferably determined as the maximum of the melting endotherm on the first heat, measured by Differential Scanning Calorimetry (DSC). Glass transition temperature ($T_g$), is the inflection point of the step transition associated with the glass transition on a DSC trace heated at about 10° C./min. Average bulk temperature of a polymer particle is the average temperature of the mass of the particle or the average of the temperature in every location of the particle. The term "measured or actual maximum crystallization rate temperature ($T_c$)" is the experimentally determined definition known in the art. The determination of $T_g$ and $T_m$ is described in ASTM D-3419-99 "Standard Test Method for Transition Temperatures of Polymers by Differential Scanning Calorimetry".

The temperature of maximum crystallization rate ($T_c$) can be experimentally determined by several methods. One such method is to observe the initial growth rate of spherulitic structures from a thin slice of amorphous melt by polarized-light microscopy, make photographic measurements and plot the rate versus the applied temperature. This and other methods are described in J. M. Schultz, "Polymer Crystallization: The Development of Crystalline Order in Thermoplastic Polymers", 2001 Oxford U. Press 127-139.

Values of $T_c$ may be found in the literature for a wide range of polymers. According to U.S. Pat. No. 5,540,868, it is also possible to estimate $T_c$ calculating the average of the glass transition and melting temperatures using Formula (1):

$$T_c = (T_g + T_m)/2 \qquad (1)$$

For the purposes of this invention, this value of $T_c$ is a reasonable approximation of the true temperature of maximum crystallization rate. U.S. Pat. No. 6,451,966 B1 gives approximate $T_g$ and $T_m$ values for some useful polyesters to which is added calculated $T_c$ values in the table below.

|  | $T_g$, ° C. | $T_m$, ° C. | Calculated $T_c$, ° C. |
|---|---|---|---|
| PET | 70 | 260 | 165 |
| PEN | 120 | 270 | 195 |

-continued

|     | $T_g$, °C. | $T_m$, °C. | Calculated $T_c$, °C. |
|-----|------------|------------|-----------------------|
| PBN | 82         | 242        | 162                   |
| PTT | 35         | 227        | 131                   |

The values for $T_g$, $T_c$, and $T_m$ can vary somewhat, for example, with the morphology, thermal history, molecular weight, moisture level and initial crystallinity on a polymer. For example, PET with a low degree of polymerization between 10 and 20 typically has a $T_m$ of about 250° C., a $T_g$ of about 60° C., and a $T_c$ of about 155° C. U.S. Pat. No. 5,744,578 teaches crystallizing PEN in liquid at a temperature in the range of about 20° C. above a glass transition temperature ($T_g$) and about 10° C. below a melting temperature ($T_m$).

An object of the present invention is to quench freshly formed molten polymer particles in a cooling liquid to solidify the exterior of the polymer particles while still maintaining average bulk temperature of the polymer particles in the range at which they crystallize at a reasonable rate.

Another object of the present invention is to replace the aforementioned cooling liquid containing the solid polymer particles with a warming liquid that has a temperature at or above the aforementioned average bulk temperature of the polymer.

A further object of the present invention is to upwardly transport solid polymer particles in liquid to the SSP reactor system.

A further object of the present invention is to crystallize solid polymers in liquid while transporting the polymer in liquid to an SSP reactor system.

SUMMARY OF THE INVENTION

The present invention is a process and apparatus for conserving loss of heat while forming and crystallizing polymer particles in a liquid. We have discovered that by adjustment of the cooling liquid temperature and duration of the cooling in a suitable apparatus, the average bulk temperature of the polymer particles can be lowered enough to efficiently form solid granules in the extrusion and cutting operation, but leave the average bulk temperature of the particle within the temperature range in which rapid crystallization occurs.

After the cooling liquid is replaced with warming liquid, the temperature of the polymer is inside this crystallization range, and the exothermic nature of this crystallization further heats the particle to a higher temperature, which accelerates the rate of crystallization.

In an embodiment, the temperature of the warming liquid is never below the average bulk temperature of the polymer such that the warming liquid is never cooling the polymer. This invention provides for less wastage of the heat energy of the hot melt due to cooling it down completely and then heating it up to crystallization temperature. Further, in an embodiment, the majority of the crystallization takes place in the warming fluid used to transport the granules to the SSP, reducing the necessary processing time. Furthermore, the need for pneumatically conveying hot plastic chips to the SSP is eliminated, which avoids the risk of agglomeration due to friction and dusting of the hot chips.

BRIEF DESCRIPTION OF THE DRAWING

The FIGURE is a schematic view of the present invention.

DETAILED DESCRIPTION OF THE INVENTION

The present invention can be used for forming molten polymer into particles if the polymer must be cooled after it is formed into a desired shape. The polymer of the present invention is preferably a crystallizable thermoplastic polymer. Polyester polymer is particularly suitable for the present invention and PET polymer is preferred. Copolymers of PET and polyesters are also suitable.

Description of the present invention will be made with respect to the FIGURE. The present invention comprises a particulation and quench system 2 serviced by cooling liquid, a crystallization section 4 serviced by warming liquid and an SSP reactor system 6. The particulation and quench system 2 comprises a molding device 10 that receives polymer resin from a line 12. The resin in the line 12 is either already molten or the molding device 10 heats it above the melting temperature to put the polymer into the molten state. Any of several ways can be used to form the molten polymer into particles. However, it is important that the polymer particles spend relatively little time in the quench liquid and the time between particles forming and entry into the warming liquid be minimized. However, the die-face polymer cutter of GB 1,143,182 is preferred for minimizing cooling before warming. In an embodiment, the molten polymer resin enters a pressurized chamber 14 and is extruded though an orifice plate 16 whose face is swept by a rotating cutter. The extruded polymer enters a cooling chamber 18 through the orifices and is cut into polymer particles while quenched under pressurized cooling liquid delivered through an inlet into the chamber 18 by a line 20. The cooling liquid solidifies the exterior of the polymer particles while preferably leaving the interior molten. The polymer particles in the cooling liquid will be transported from the cooling chamber 18 preferably directly to a screen catcher 22. In the screen catcher 22, an inclined screen 24 has perforate dimension to allow passage of polymer particles of a maximum size and reject particles over the maximum size through a line 26 to be re-melted. Although not shown, the line 26 may deliver rejected polymer particles to a lock hopper with sequentially operated pressure valves to avoid loss of system pressure. The mixture of cooling liquid and polymer particles that pass through the inclined screen 24 preferably pass directly to a cooling liquid removal device 28. The cooling liquid removal device 28 may include an elbow-shaped profile screen, a dewatering cone, a centrifuge or a hydrocyclone which quickly removes polymer particles from a substantial amount of the cooling liquid. In an embodiment, the cooling liquid removal device 28 is a disc stack centrifuge made by Alfa-Laval AB. An alternative centrifuge is made by Dorr-Oliver Eimco, Ltd. The centrifuge of the cooling liquid removal device 28 revolves at high speed to separate the cooling liquid removed from the top thereof in a line 30 and the polymer solids removed in a line 32. Higher efficiency of the separation in the cooling liquid removal device 28 will result in higher conservation of heat in the polymer particles. Centrifuges may achieve 90% efficiency in separating liquid from solids whereas static devices may only be about 60% efficient. The cooling liquid remaining with the solid polymer particles serves to facilitate flow of the particles out of the centrifuge in the line 32. The objective of the cooling liquid in the line 20 will be to facilitate forming of the polymer into particles which requires a lower temperature to solidify the particle exterior while not reducing the average bulk temperature of the polymer below the minimum crystallization temperature ($T_{c_{min}}$) for the polymer. $T_{c_{min}}$ for a polymer is temperature at which the spherulite growth rate is less than 10% of the maximum growth rate for the polymer. The spherulite growth rate can be measured in terms of diametric growth in microns per second by direct optical examination of a crystallizing polymer sample under polarized light by a hot stage microscope as is known in the art. Defined in this way, the $T_{c_{min}}$ for PET is 120° C. which is about 45° C. below the $T_c$. A $T_{c_{min}}$ of 120° C. may be generally applicable for all polyesters in the context of the present invention. Hence, the combination of the cooling liquid temperature and the residence time of the polymer particles in the cooling liquid between the cooling chamber 18 through the cooling liquid removal device 28 should operate such that the average bulk temperature of the polymer will not go below the $T_{c_{min}}$. The temperature of the molten polymer before quenching will be above about 260° C. and preferably at least 270° C. The temperature of the cooling liquid will typically be no more than 100° C. for PET. However, higher temperatures may be used at suitably higher pressures to avoid liquid boiling. Cooling liquid may be selected from any compatible material, preferably those which have compatibility with the polyester resin and introduce minimal degradation. The cooling liquid is preferably water and may include additives such as ethylene glycol to raise the boiling point. However, other liquids such as ethylene glycol or related glycols may be added for purposes such as fostering crystallization. The relationship of the temperature of a polymer to the amount of cooling to which it is subjected by the cooling liquid is shown in Formula (2):

$$(T_{molten} - T_q) * (mC_{P_{resin}}) = Q_{cooling} \qquad (2)$$

wherein, $T_q$ is the average bulk temperature of the resin particle after it is removed from the cooling liquid and before it is immersed in the warming liquid, m is the mass flow rate of the resin, $C_{P_{resin}}$ is the average heat capacity of resin, $Q_{cooling}$ is the heat lost during the particulation and quenching step and $T_{molten}$ is the temperature of molten polymer leaving the melt phase process in the line 12 and entering the molding device 10. In an embodiment, it is desirable to ensure that $T_q$ does not descend below the $T_{c_{min}}$ which is 120° C. for PET. In an embodiment, the molding device 10, the screen catcher 22 and the cooling liquid removal device 28 of the particulation and quench section are integrally united to each other to minimize polymer cooling time and more easily maintain pressure. It is also contemplated the screen catcher 22 may be omitted in which case the molding device 10 and the cooling liquid removal device 28 would be integrally united. Conduits connecting the units are also contemplated, but relatively long conduits will increase the degree of cooling which is undesirable.

The cooling liquid in the line 30 exiting the cooling liquid removal device 28 is carried to a cooling liquid reservoir 40. Cooling liquid is removed in a line 42 from the cooling liquid reservoir 40 by a pump 50 discharging into a line 52 which delivers it to a filter 44 that removes undersized polymer particles for further re-processing in a line 46. In one embodiment, the filter can be of a back-washed type. A lock hopper (not shown) may be used on the line 46 to allow the particles to be removed without depressurizing the system. A line 48 delivers the cooling liquid to an optional cooler 54 from which the line 20 recycles the cooling liquid to the molding device 10. The cooler 54 may be included to maintain the cooling liquid temperature in the optimal cutting temperature range for the particulation operation.

The crystallization section 4 begins with a conduit or line 38 that delivers warming liquid to carry polymer exiting the cooling liquid removal device 28 in the line 32. The line 38 preferably delivers warming liquid at or downstream of the cooling liquid removal device 28. The warming liquid will be at a higher temperature than the cooling liquid. However, in an embodiment, the warming and cooling liquid will be in fluid communication and under the same system pressure in order to quickly replace the cooling liquid with warming liquid as the cooling liquid exits from the cooling liquid removal device. In this way, the objective of minimizing heat loss is achieved. The polymer leaving the cooling liquid removal device 28 will still be in the optimal temperature range at which crystallization occurs which is greater than or equal to $T_{c_{min}}$. The exterior of the polymer particle should be solid while the inside of the particle is molten, thereby fostering continuing crystallization. The crystallizing polymer will give off a heat of crystallization which will operate to self-heat the polymer particles. To take advantage of this heat of crystallization, it is important that the temperature of the warming liquid introduced in the line 38 be maintained at a temperature which is no less than the maximum average bulk temperature that the polymer achieves while in contact with the warming liquid. The average bulk temperature of the crystallizing polymer in the warming liquid is designated as $T_w$. In an embodiment, $T_w$ will at least be greater than $T_{c_{min}}$ which is 120° C. for PET and preferably be between 150° and 180° C. for PET which is within plus or minus 15° C. of $T_c$ which represents a suitable temperature range that includes the temperature which achieves the maximum crystallization rate. Higher temperatures may also be suitable. Formula (3) shows the relationship of $T_w$ to $T_q$:

$$T_w \geq T_q + m(\Delta X_f)(H_c) \qquad (3)$$

wherein $T_w$ is the average bulk temperature of the polymer in the crystallization step, $\Delta X_f$ is the difference in fraction of crystallinity to be achieved in the crystallization step and the fraction of crystallinity of the polymer after the particulation and quenching steps, $H_c$ is heat of crystallization, which is typically 120 J/g for PET. $T_w$ is preferred to be in the range of the maximum rate of primary crystallization which for PET polyester should be about 150° to 180° C. but can be as high as the temperature of further downstream processing but below the softening temperature of PET. The softening temperature range of typical PET copolymer is considered to be the point at which it begins to undergo irreversible plastic deformation under a mechanical strain, typically measured by a thermomechanical analyzer or deformation temperature under load (DTUL) apparatus. For a typical commercial resin having a main melting peak temperature as measured by DSC of about 250° C., the softening temperature range would be about 230° to 250° C. In this temperature range, the molecular motion is so high that the crystallization rate is significantly slower than at $T_c$.

The line 32 may transfer the mixture of polymer particles and the warming liquid to an optional holding tank 34 in which sufficient residence time may be given to allow the polymer particles to crystallize to the desired level. The desired level of crystallinity for the polymer with respect to further solid stating is defined as that minimum percent crystallinity which is high enough so that further exothermic heat release in the solid stating reactor is not likely. The exact level may differ between resins. The percent crystallinity is typically estimated from the density of the granule by its buoyancy in a gradient density column according to ASTM D1505-98 "Standard Test Method For The Density Of Plastics by Density-Gradient Technique", assuming 0% crystallinity (completely amorphous resin) to have a density of 1.332 g/cc and 100% crystallinity to have density of 1.455 g/cc. A typical value for resin crystallinity suitable for PET copolymer in a downstream SSP is 15 to 35%. A line 36 delivers the mixture of warming liquid and polymer particles to the inlet of a riser 60 which transports the warming liquid and the polymer particles up to an elevation near the top of an SSP reactor system while giving the polymer particles sufficient time to crystallize. The transport liquid riser 60 operates in plug-flow and, in an embodiment, with a minimum of a one-minute residence time. Shorter residence times are contemplated if the holding tank 34 is used. A line 62 delivers the effluent from an outlet of the riser 60 to a hydrocyclone 64 such as a disengaging hydrocyclone in which the warming liquid is roughly separated from the polymer particles which have achieved a crystallization between 15 and 35% based on density measurement. The bulk of the warming liquid is expelled from the disengaging hydrocyclone 64 through a line 66 and delivered to a warming liquid reservoir 68. The makeup of pressurized fluid to the warming liquid reservoir 68 for the entire system through a pressure control valve 109 regulated by a pressure control PC will hold the system pressure to be above flash pressure of the warming liquid, so as to keep the warming liquid in liquid phase. Since the warming liquid will have a temperature between about 120° and about 230° C. for PET, the gauge pressure will be between about 131 kPa (19.1 psig) and about 2731 kPa (136 psig) accounting for an overpressure of about 35 kPa (5 psig) if the warming liquid is water. For example, when the warming liquid is water and is kept at a temperature of 180° C., the system gauge pressure will be 935.9 kPa (136 psig). Lower pressures may be used for warming liquids with higher boiling points. Polymer particles and remaining warming liquid are removed from the hydrocyclone 64 and transferred through an inlet valve 70 into a flash vessel 72. In the flash vessel 72, the pressure is released to allow the warming liquid at high temperature to flash away as gas from the polymer particles as vapor. The flashed vapor of the warming liquid is removed from the flash vessel 72 in a line 74. The vapor of the flashed warming liquid may be discharged to atmosphere or, in another arrangement, condensed to liquid and pumped to the circulating inventory of warming liquid. This arrangement is not shown in the FIGURE. The flash vessel 72 may comprise a double lock hopper whereby effluent from the hydrocyclone 64 enters through the inlet valve 70 which is open while an outlet valve 76 is closed. After a batch of wet polymer particles enter the inlet valve 70, the inlet valve 70 is closed and the outlet valve 76 is opened, allowing a rapid pressure reduction and the warming liquid to flash off in the line 74. For continuous flash of warming liquid from the polymer particles, an optional vessel (not shown) with an inlet regulated by a ball valve and a pinch valve to maintain upstream pressure and isolated from downstream lower pressure allows wet polymer particles from the hydrocyclone 64 to enter a vessel of lower pressure. The lower pressure vessel may include a dewatering screen from which the warming liquid drains and flashes off and is transported to the line 74 which is optionally delivered to the warming liquid reservoir 68 as set forth in the aforementioned description. However, in the embodiment according to the FIGURE, the polymer effluent from the flash vessel 72 in a line 78 is in crystalline form and ready for SSP processing.

The crystalline polymer particles are delivered to the SSP reactor system 6 which in the embodiment of the FIGURE, begins with a vibrating fluidized bed 80. A blower 82 blows hot inert gas into the fluidized bed 80 to distributor lines 84. The hot inert gas bubbles through the polymer particles to form an ebulliated bed to further dry the polymer particles and conduct additional crystallization. Inert gas leaves the fluidized bed 80 through a line 86 while the dry polymer particles transport through a line 88 and enter a crystallizer 90. The polymer particles are subjected to heat and mechanical agitation by a paddle rotor in the crystallizer 90 to move the polymer particles from inlet end to outlet end. The polymer particles entering the SSP reactor system 6 are at a temperature of about 180° to 200° C. and preferably about 190° C. which is the preferred inlet temperature of polymer particles entering an SSP reactor 94. However, other temperatures may be suitable. An inlet line 92 delivers polymer particles from the crystallizer 90 into the SSP reactor 94. The SSP reactor 94 is preferably a downwardly flowing SSP reactor, but a batch SSP reactor may be suitable. In some cases, an additional crystallizer will be needed. However, in some conditions, the flow scheme of the FIGURE may operate to obviate the need for the fluidized bed 80, the blower 82 and the crystallizer 90 and deliver flashed polymer particles from the flash vessel 72 directly into the SSP reactor 94 upon reaching sufficient crystallization in the riser 60 prior to entering the hydrocyclone 64. Polymer particles move downwardly in the SSP reactor 94 counter-currently to the flow of hot inert gas, which is preferably nitrogen, to upgrade the molecular weight to the degree of polymerization of the polymer particles. Inert gas may enter through a line 96 while upgraded polymer particles exit the SSP reactor 94 through an effluent line 98. Makeup warming liquid may be added to the warming liquid reservoir 68 through the pressure control valve 109 entering a line 100 to make up for warming liquid losses. Warming liquid exits the warming liquid reservoir 68 through a line 102 and pumped by the pump 108 in a line 110 to a filter 104. The warming liquid is filtered of any polymer particles in the filter 104 to remove undersized particles, which particles leave through a line 106 to possibly undergo further processing. A lock hopper (not shown) may be used on the line 106 to enable removal of the particles without depressurizing the system. A line 111 delivers warming liquid to a trim heater 112 and becomes the warming liquid in the line 38 that is introduced to polymer particles exiting the cooling liquid removal device 28 in the crystallization section 4.

The flow scheme of the present invention operates to minimize the contact time between the newly solidified polymer particles and the cooling liquid. The newly solidified polymer particles and cooling liquid are quickly transported from the molding device 10 to the cooling liquid removal device 28 to rapidly separate the cooling liquid from the polymer particles and replace the cooling liquid with warming liquid. Minimizing cooling allows the exterior of the polymer particles to solidify allowing particle formation while the molten interior continues to crystallize because the average bulk temperature of the particles is still in the optimal crystallization range. Quick exchange between the cooling liquid and the warming liquid allows the crystallization to proceed while the particles are transported to the SSP reactor. The system pressure, in an embodiment, is maintained by the pressure control valve 109 at a pressure that prevents the warming liquid from entering the vapor phase until polymer particle transport and crystallization have reached the desired level.

The present invention is advantageous because the polymer particles are solidified at process temperatures well below the softening temperature which is 250° C. for PET so that the molded polymer takes on a good shape. Polymer particles are crystallized in a liquid in which the exothermic heat of crystallization can be easily absorbed into the liquid which is more manageable than controlling the exotherm in dry gaseous environment which runs the risk of melting or particle-particle and particle-pipe agglomeration. The inlet of the SSP reactor system 6 is remotely high in relation to the molding and crystallization systems of the process. The liquid riser 60 facilitates sufficiently rapid transport from the crystallization zone to the SSP reaction zone to avoid thermal degradation that can occur in the polymer particles. No excess of heat loss occurs between the molding process which is operated at high temperatures, usually above 270° C. for PET and the SSP process typically operating above 190° C. for PET. Additionally, the conveying in the liquid riser avoids the disadvantage of having to cool the polymer particles during transport to below a glass transition temperature which is 70° C. for PET to avoid stickiness resulting from insufficient crystallization and then having to heat the polymer particles back up to the SSP reaction temperature.

The invention claimed is:

1. An apparatus for producing solid crystallized polymer particles comprising:
    a molding device for forming molten polymer in a quenching chamber with a cooling liquid inlet for quenching said molten polymer in a cooling liquid to obtain solid polymer;
    a cooling liquid removal device in fluid communication with said quenching chamber for removing a substantial amount of said cooling liquid from said solid polymer;
    a conduit for transporting solid polymer from said cooling liquid removal device in warming liquid to a riser; and
    said riser for lifting said solid polymer and warming liquid to a top of an SSP reactor system.

2. The apparatus of claim 1 further including an conduit for introducing warming liquid to said solid polymer at or downstream of said cooling liquid removal device.

3. The apparatus of claim 1 further including a warming liquid removal device for separating warming liquid from said solid polymer downstream of said riser.

4. The apparatus of claim 1 further including a depressurizing device downstream of said riser for flashing off said warming liquid from said solid polymer.

* * * * *